United States Patent [19]

Carter, deceased

[11] Patent Number: 5,029,996
[45] Date of Patent: Jul. 9, 1991

[54] MICROSCOPE VIEWING ARRANGEMENT

[75] Inventor: Stephen Carter, deceased, late of Kettleshulme, England, by Janet E. Carter, heir

[73] Assignee: Buxton Micrarium Limited, Derbyshire, England

[21] Appl. No.: 245,270

[22] Filed: Sep. 16, 1988

[30] Foreign Application Priority Data

Sep. 17, 1987 [GB] United Kingdom ............... 8721878

[51] Int. Cl.⁵ .................... G02B 21/26; G02B 21/32; G02B 21/36
[52] U.S. Cl. ................................. 350/532; 350/508
[58] Field of Search ............. 350/507, 529, 532, 535, 350/536, 508

[56] References Cited

U.S. PATENT DOCUMENTS

| 3,762,798 | 10/1973 | Grubb et al. | 350/532 |
|---|---|---|---|
| 3,764,215 | 10/1973 | Wallach | 350/536 |
| 4,405,202 | 9/1983 | Kimball | 350/529 |
| 4,453,807 | 6/1984 | Faulkner et al. | 350/529 |
| 4,589,741 | 5/1986 | Clegg | 350/532 |
| 4,626,906 | 12/1986 | Ensor | 350/508 |
| 4,784,481 | 11/1988 | Wuerfel | 350/529 |

FOREIGN PATENT DOCUMENTS

| 3741735 | 7/1988 | Fed. Rep. of Germany . | |
|---|---|---|---|
| 1197111 | 11/1959 | France | 350/507 |
| 1197952 | 12/1959 | France . | |
| 57-14818 | 1/1982 | Japan . | |
| 270719 | 12/1986 | Japan . | |
| 232793 | 4/1925 | United Kingdom . | |
| 788270 | 12/1957 | United Kingdom . | |
| 880708 | 10/1961 | United Kingdom . | |
| 1065490 | 4/1967 | United Kingdom . | |
| 1428732 | 3/1976 | United Kingdom . | |
| 1523669 | 9/1978 | United Kingdom . | |
| 1545437 | 5/1979 | United Kingdom . | |

OTHER PUBLICATIONS

Optical Spectra, "Viewing in a Vacuum", Apr., 1970, p. 30.
Nikon, Nikon Optistation, Oct. 1984, #5032.

Primary Examiner—Rodney B. Bovernick
Assistant Examiner—James Phan
Attorney, Agent, or Firm—Oblon, Spivak, McClelland, Maier & Neustadt

[57] ABSTRACT

There is disclosed a microscope viewing arrangement adapted for exhibition use comprising a plurality of microscopes, each of said microscope comprising console enclosing a microscope arrangement and affording a common viewing position, remote focussing means operable from the viewing position, and a lamp arrangement adapted to illuminate a specimen position, the focussing means, the lamp arrangement and the specimen position being, in use, inaccessible from the viewing position, and information display means adapted to display information relevant to a specimen mounted in the specimen position and to be changed with such specimen.

3 Claims, 6 Drawing Sheets

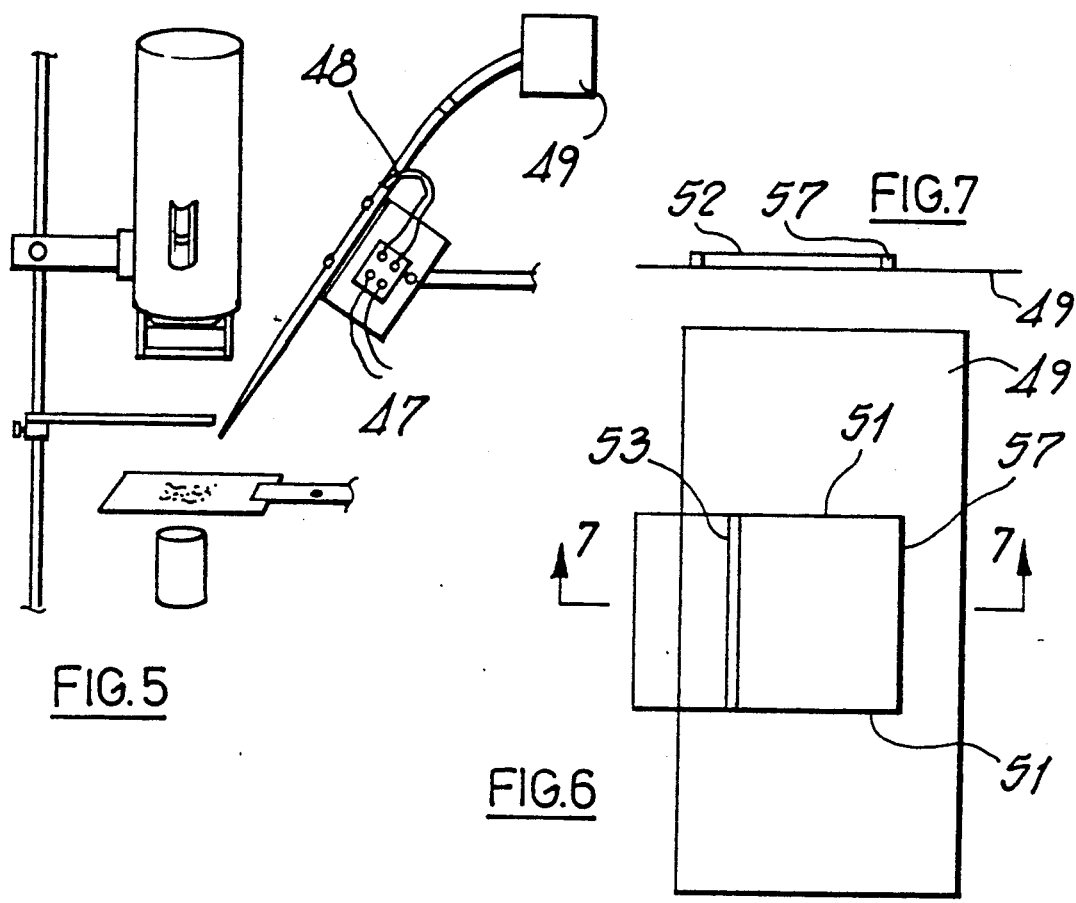
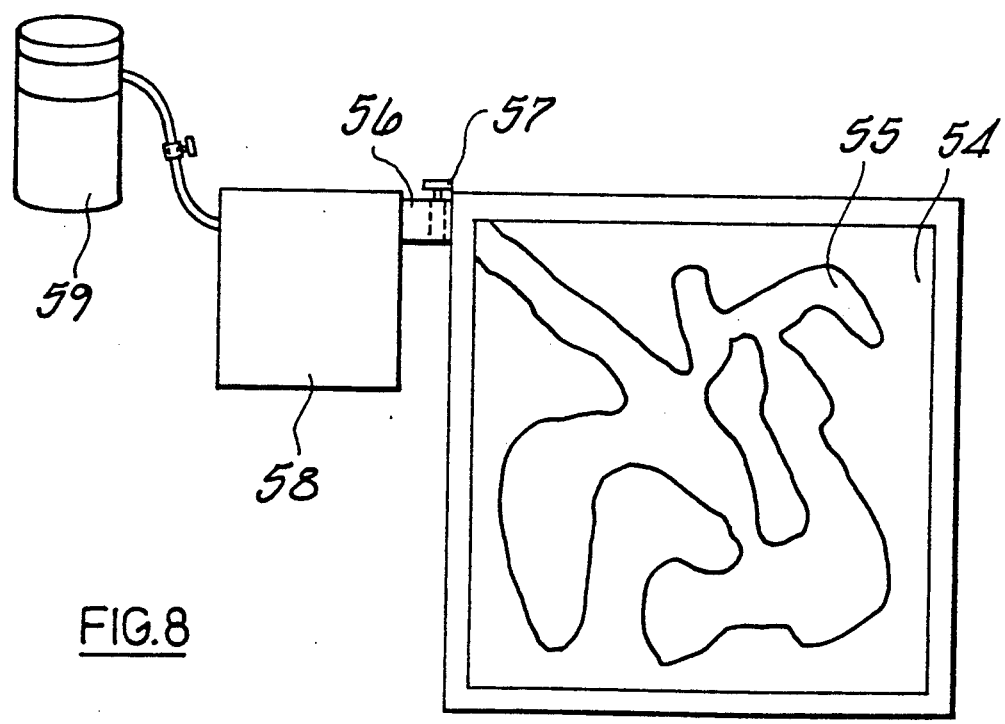

MICROSCOPE VIEWING ARRANGEMENT

This invention relates to microscope viewing arrangements.

BACKGROUND TO THE INVENTION

Microscopes are fascinating but often delicate instruments that can help stimulate interest in matters scientific or biological in those who have no adequate training, or even responsibility, such as small schoolchildren, to be able to use them properly. To foster such interest the concept of the micrarium, which is essentially a museum or exhibition of microscopy has been developed. Despite supervision, however, the instruments are at risk, at least of becoming mis-adjusted and require constant attention.

The present invention provides a microscope viewing arrangement which avoids the major risks, yet allows viewers to have control over the microscope.

SUMMARY OF THE INVENTION

The invention comprises a microscope viewing arrangement adapted for exhibition use comprising a console enclosing a microscope arrangement and affording a viewing position, remote focussing means operable from the viewing position, and a lamp arrangement adapted to illuminate a specimen position, the focussing means, the lamp arrangement and the specimen position being, in use, inaccesible from the viewing position, and information display means adapted to display information relevant to a specimen mounted in the specimen position and to be changed with such specimen.

Dual control means, may be arranged also at a position adjacent to the specimen position.

The arrangement may comprise specimen magazine means controlled from said viewing position and adapted to hold a plurality of specimens and postion them individually in said specimen position. Said information display means may be interconnected with said specimen magazine means whereby to display information relevant to each individual specimen when located in said specimen position.

Said console may have a plurality of information panels each adapted to certain information relevant to a specimen, and selection means selectively illuminating said display panels. This may be adapted for use with specimen magazine means to illuminate a particular information panel on location of a particular specimen in said specimen positions.

Said specimen magazine means may comprise an indexible carousel arrangement and indexing means therefore operable from the console, as well as slide adjusting means operable from the console again, to selectively positioning a slide in the optical path for viewing different areas thereof.

The arrangement may comprise magnification change means by which different lenses may be positioned in the optical path by a console control. A lens giving a lower magnification of two or the lowest magnification of more than two lenses of the magnification change means may be automatically selected when a specimen change is made. An indication of the magnification in use may desirably appear at the viewing positions.

The microscope viewing arrangement may comprise a transmitted light, projection microscope arrangement having the lamp arrangement; microscope arrangement and specimen position located in an elevated position with respect to the console and the microscope projecting an image of the specimen downwardly on to a viewing screen.

The arrangement, however, may comprise a transmitted light, projection microscope arrangement and a back projection system with the lamp arrangement, microscope arrangement and specimen position located behind the console and projecting an image of the specimen upwardly via a mirror on to a viewing screen.

The viewing screen may be on an incline and a mask may be placed in the optical path to trim the image to fit the inclined viewing screen.

The microscope viewing arrangement may, on the other hand comprise a microscope arrangement of which an eye-piece is situated in the console at the viewing position. The microscope here may comprise a reflected light or a transmitted light arrangement.

Various interesting observations may be facilitated by ancillary equipment. Thus, for example, the arrangement may be adapted for observation of crystal melting and formation by comprising a heatable air jet arrangement operable from the console to direct warm or cool air at a crystal specimen to melt or crystallise the same.

Polarizing and/or other filters may also be provided, selectively movable into the optical path from console controls.

Live specimen chambers may also be provided which may comprise a microscope slide with a specimen region surrounded by a wall of material such as silicone rubber which is oxygen- but not water- permeable, and topped with a cover slip. The wall may not completely surround the specimen, a reversible closure being provided thereto. A live specimen chamber, such as an artificial ants' nest, may comprise food, water and air supply means.

BRIEF DESCRIPTION OF THE DRAWINGS

Embodiments of the microscope viewing arrangements according to the invention will now be described with reference to the accompanying drawings, in which:

FIG. 5 is a view of a crystal melting arrangement;

FIG. 6 is a plan view of a microscope slide with a closable live specimen chamber;

FIG. 7 is a section on the line 7—7 of FIG. 6;

FIG. 8 is a view of an ants' nest arrangement;

DETAILED DISCLOSURE OF THE PREFERRED EMBODIMENT

Figure 1:
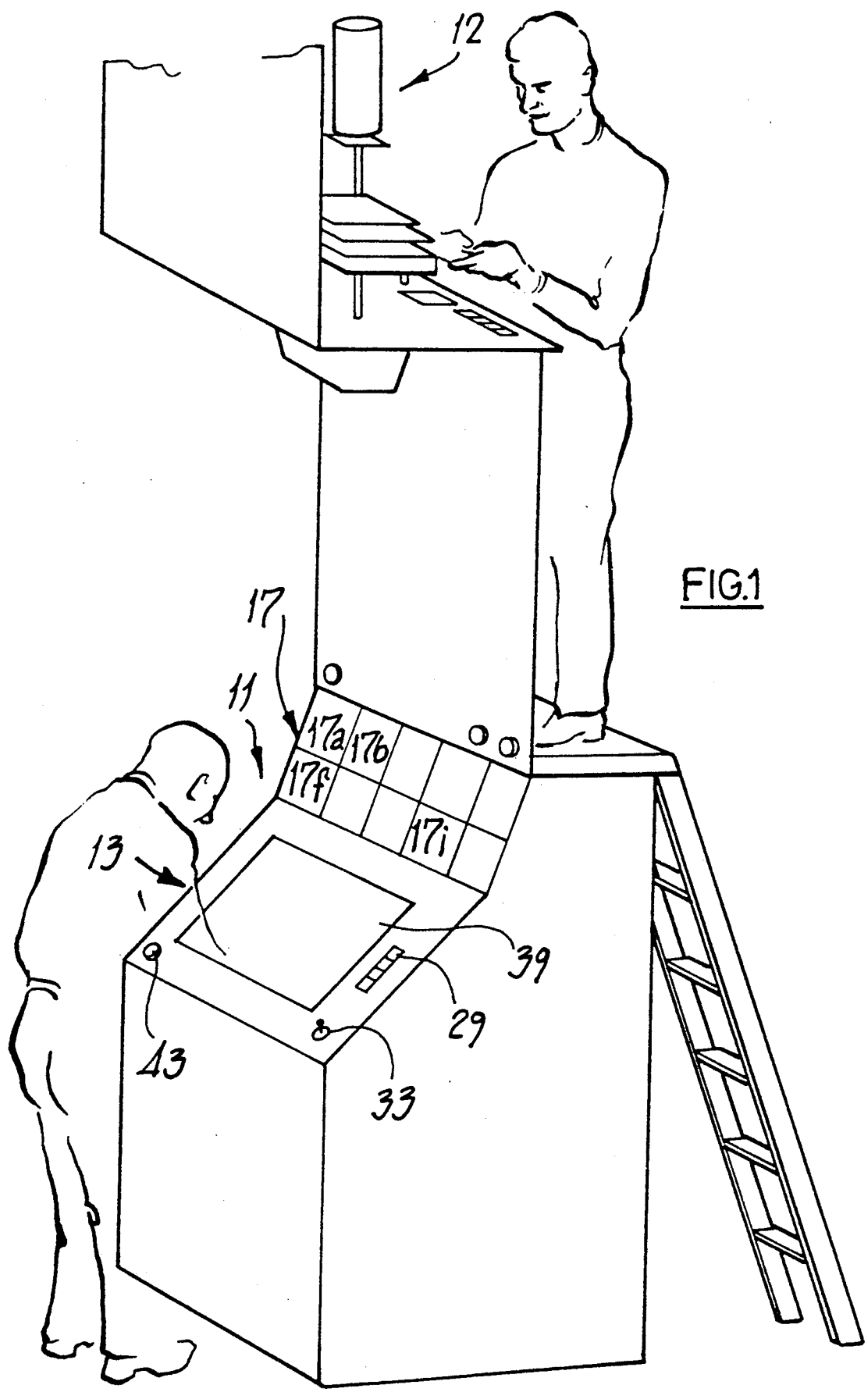
FIG. 1 is a general view of one embodiment.

FIGS. 1 to 4 illustrate a microscope viewing arrangement adapted for exhibition use comprising a console 11 enclosing a microscope arrangement 12 and affording a viewing position 13. The arrangement comprises remote focussing mean 14 operable from the viewing position 13 and a lamp arrangement 15 adapted to illuminate a specimen position 16. The focussing means 14, the lamp arrangement 15 and the specimen position 16 are, in use, inaccessible from the viewing position. The arrangement also comprises information display means 17 adapted to display information relevant to a specimen mounted in the specimen position 16 and to be changed with such specimen.

Specimen magazine means 18 are controlled from the viewing position 13 and comprise an indexable carousel arrangement 19 with clamps 21 for holding slides 22 in radially-extending fingers 23. The carousel arrangement has a slide setting position with a scale 24 by which a technician can accurately align a slide 22 in the carousel arrangement. Slides 22 for use in the arrangement have a strip of grip tape 25 for secure holding in the clamps 21. An indexing arrangement for the carousel 19 comprises a motor 26 rotating the carousel until detent 27 engages an indexing notch 28 in the carousel.

Indexing is controlled from a push button 29 in the console 11 which energises a solenoid 31 to retract the detent 27 and energises the motor 26 to rotate the carousel until the detent, with the solenoid 31 de-energized once the motor 26 has started, drops back under a bias into the next notch 28, locating the carousel and de-energizing the motor 26.

Of course, the detent arrangement could be replaced by an optical sensor and the motor 26 could be a stepper motor controlled by an integrated circuit arrangement under the control of a timing arrangement enabling the carousel to be indexed either automatically at set time intervals or manually by a console control which might override the automtic arrangement.

The carousel 19 is mounted on a stage 32 which has movement in two orthogonal directions for moving the slide 22 relatively to the optical axis to view different areas thereof. The stage 32 movement is controlled from the viewing position 13 by a joystick arrangement 33 on the console 11 connected as by a pneumatic arrangement or electrically through stepping motors (not shown).

A centering lamp (omitted for clarity's sake) is mounted on the stage 32 to shine a spot of light, when switched on from the viewing position, at the center of the slide. This enables the viewer to rapidly locate the center of the slide in the viewed image for orientation purposes. The centering light is switched off once the center has been found.

The carousel 19 has a position transducer arrangement, illustrated diagrammatically at 34, which signals to an information display controller 35 to display information on the display 17 appropriate to whatever slide 22 is currently being viewed. The information display illustrated comprises panels 17a, 17b etc . . . each of which has a transparency which is inserted by a technician setting up a particular display corresponding to the slide 22 for which such panel is selected. The controller then illuminates the appropriate panel 17a, 17b etc . . . Clearly, a single panel could be used, with a set of transparencies arranged on a display carousel which is moved according to the movement of the slide carousel 19. Yet another arrangement would be to house a transparency mounted on the slide and to arrange that the transparency is projected on to the display 17 while the object on the slide 22 is being viewed.

The information display, however, could also be in the form of one or more video screens displaying alphanumeric or graphics information from a computer memory, and such may be provided in different languages, selectable by a control on the console. Additionally or alternatively, high quality visual images could be displayed from video tape or even from a video disc arrangement which can be made interactive with the microscope arrangement. An editing facility can be provided to update information or change the display when the slides in the carousel are changed.

Figure 2:
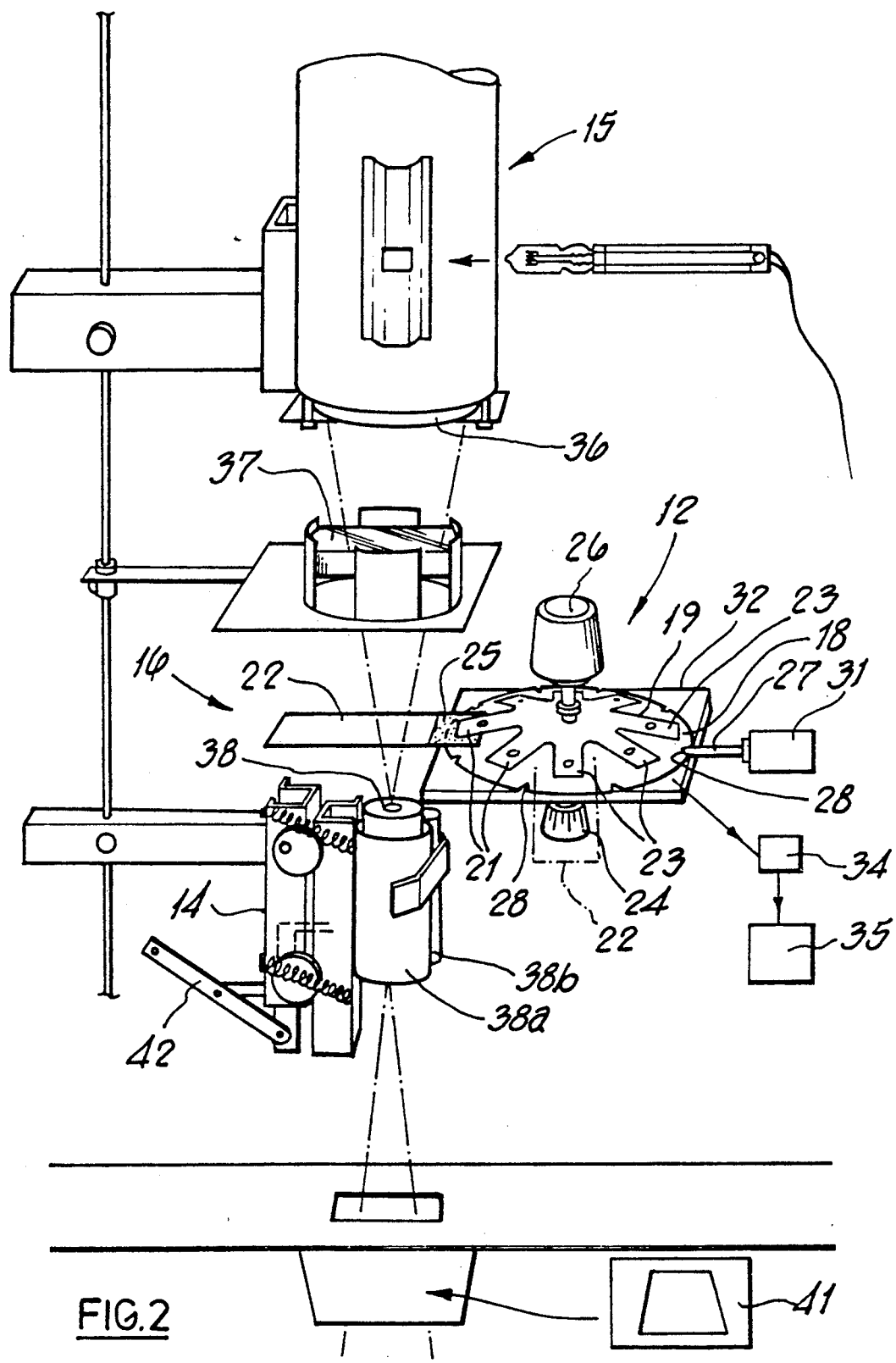
FIG. 2 is a view in more detail of the microscope projection apparatus of the embodiment shown in FIG. 1.

In the arrangement illustrated in FIG. 2, the microscope is a projection microscope in which the slides 22 are viewed by transmitted light. Light from the lamp arrangement 15, which includes a condenser lens 36, passes through a heat filter 37 and through the specimen in the slide 22. The microscope lens 38 then projects an image of the specimen already on to an inclined screen 39 at the viewing position 13, the image being trimmed to fit the rectangular screen 39 by a trapezoidal mask 41.

Two lenses 38a, 38b are interchangeably mounted on the lens position, selectable from the console 11 for different magnification. Three or more such lenses could be provided, of course, selectable by a servo or stepping motor arrangement (not shown) or otherwise as convenient. A focussing arrangement is provided which includes a mechanical linkage 42 connected to a focussing control 43 in the console 11 for adjusting the position of the lenses 38a etc . . . along the optical path. An arrangement (not shown) can be provided for indicating at the viewing position, which magnification is in use—this can be generally similar to the arrangement which displays information in slide selection, but of course caters for much less information to be displayed.

A zoom lens can of course be provided instead of (or even additionally to) fixed focus lenses. This can be selected in the same way as fixed focus lenses, if it is not the only lens provided, and its focal length and focussing can be controlled by stepper motors under microprocessor control. Pre-set focal length positions could be provided—a series of focal length buttons could be provided, depression of one of which would drive the zoom mechanism to the corresponding position.

It can be provided there whenever a slide is changed by indexing the carousel, the lower (or lowest of three or more) magnification lens is selected automatically, or the zoom lens, if provided, is set to minimum focal length.

Various filters, e.g., polarizing filters may be inserted selectively into the optical path on arrangements like this for lens changing. Likewise, arrangements may be made for indicating at the viewing position, which filter is in use. Arrangements may also be made for rotating polarizing filters and indicating the angle of polarization. Two polarizing filters may be insertable in series, on either side of the specimen position, to demonstrate the effect of crossed polarizing filters, and to investigate substances which rotate the plane of polarization.

In use of the arrangement, the viewer only has access to the front of the console 11, where the slide selection, magnification, focussing and positioning controls are situated. Access to the optics and the Mechanical and electrical components can be had only from the back of console 11, which can be closed off from the front of the console, perhaps arranged in an adjacent room. It is clearly convenient if the technician can, while changing slides, also change the informaton to be displayed about them, from the rear of the console 11. A set of dual controls 10 is provided near the specimen position.

Figure 3:
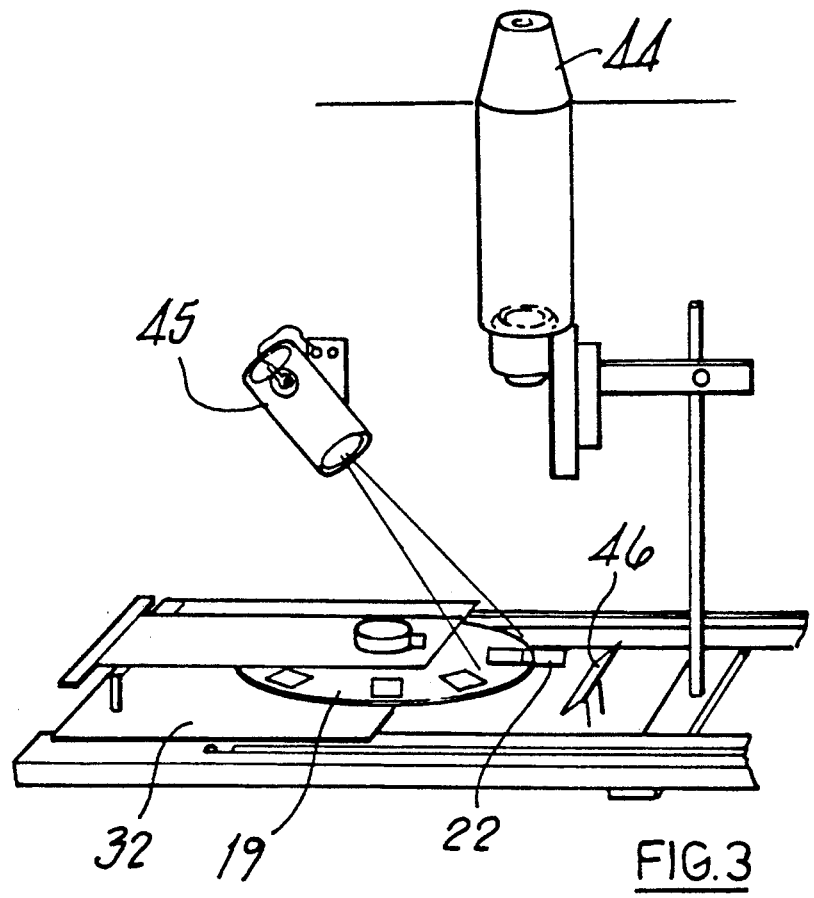
FIG. 3 is a view of a reflected light microscope arrangement.

FIG. 3 illustrates a different arrangement adapted for viewing by reflected light, but also capable of viewing by transmitted light in which the viewing position 13 has a regular microscope eyepiece 44 and the carousel 19 is arranged beneath it. As before, the carousel 19 is mounted on the moving stage 32 and is interconnected with the information display 17 to display information appropriate to the slide 22 positioned in the optical path. In such a carousel arrangement, a projection arrangement could also, of course be accommodated with the projection arrangement being essentially upside down as compared to that desired with reference to FIGS. 1 and 2.

A lamp arrangement 45 shines on to the slide 22 position in the optical path. A mirror 46 reflects light from the lamp arrangement 45 up through a slide 22 to be viewed by transmitted light.

Figure 4:
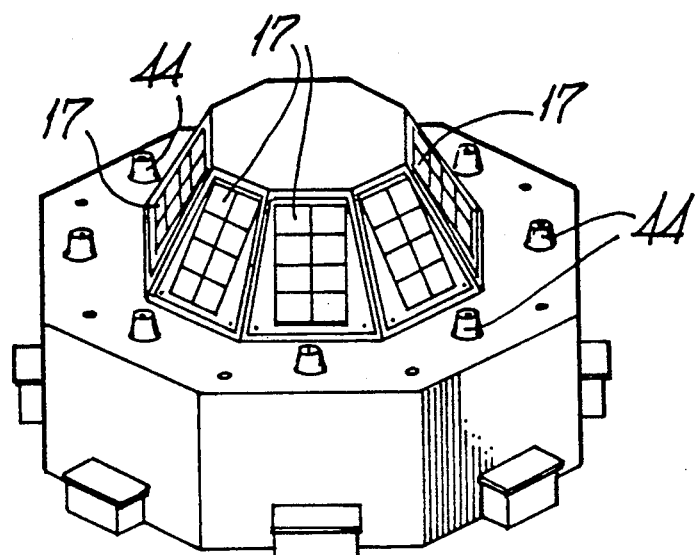
FIG. 4 is an assembly of a plurality of microscope arrangements like that illustrated in FIG. 3.

A number of microscope arrangements as illustrated in FIG. 3 can be assembled in an 'island unit' as shown in FIG. 4. Again, access from the viewing position 13 is restricted to the slide selection, slide movement and focussing controls (only one magnification being permitted in this arrangement).

Figure 9:
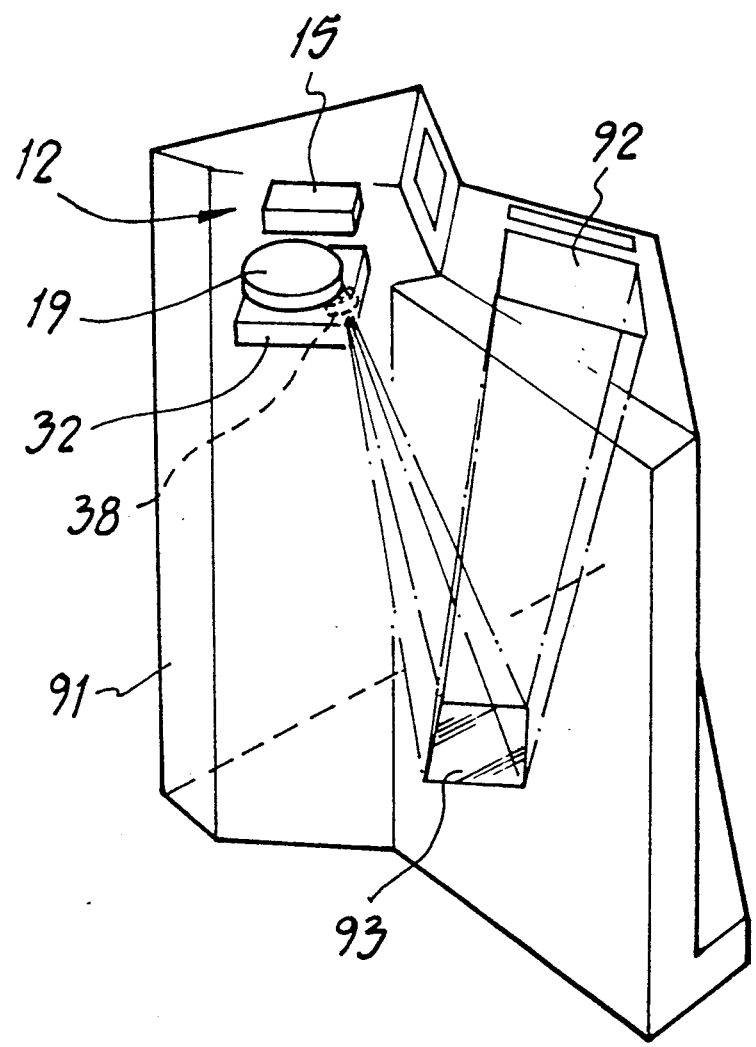
FIG. 9 is a transparent perspective view of a back projection arrangement in a housing.

FIG. 9 illustrates a back projection arrangement in which the microscope projection unit 12, comprising lamp arrangement 15, carousel 19 and stage 32 as well as the lens arrangement 38, is mounted at the top of a low profile housing 91 and back projects an image on to a screen 92 via a mirror 93 located at the base of the housing 91. The screen 92 of course must be translucent to alloW the back projected image to be viewed.

Figure 10:
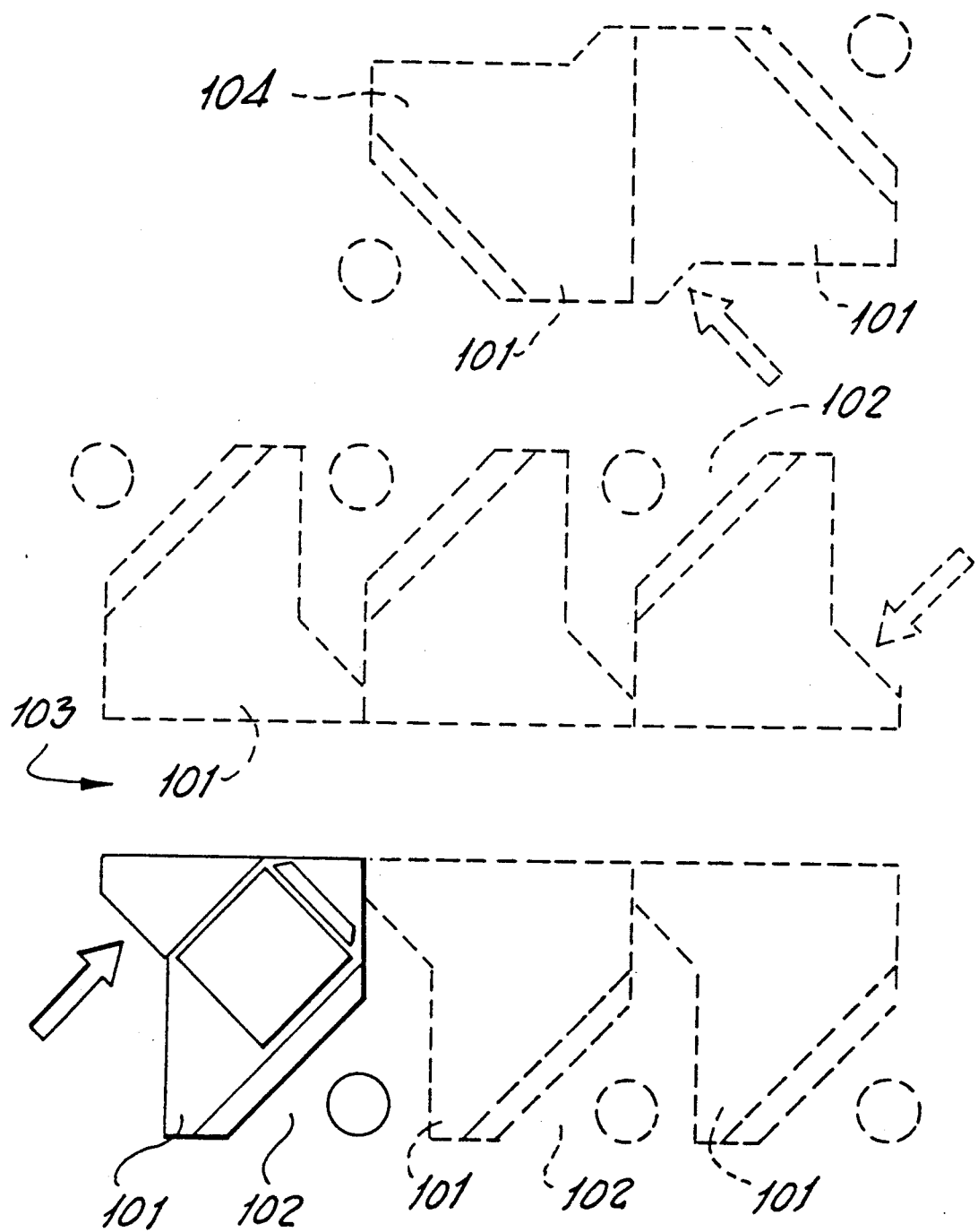
FIG. 10 is a plan view of the arrangement illustrated in FIG. 9 showing its possible relationships to other, like arrangements in a micrarium context.

FIG. 10 shows how the housing illustrated in FIG. 9 can be arranged in conjunction with other like housings in an exhibition or micrarium context. A row of housings 101 can be arranged to form alcoves 102 in which viewers may sit; two such rows are shown with an intervening passage 103 for service access. An "island" unit 104 is also illustrated. Service access for slide changing and maintenance is indicated by arrows, viewer positions by circles.

Access to the mechanism for maintenance and slide and information-changing purposes is had either from a trap door arrangement or by moving out a 'wedge' from the island unit comprising one of the microscope arrangements thereof.

Additional features can be incorporated such as the crystal melting arrangement illustrated in FIG. 5. This is illustrated for the projection arrangement of FIGS. 1 and 2, but is equally applicable to the arrangements of FIGS. 3 and 4. The crystal melting arrangements comprises a glass pipette 47 with a resistance wire 48 connected to a blower 49. The blower and current through the wire 48 are controlled by a console switch so that hot air can be blown on to the slide 22 to melt a crystal specimen therein, and, switched off, to cool the specimen to reform the crystals.

Live specimens can be viewed using special slides 49 as shown in FIGS. 6 and 7 which house a low wall 51 of silicone rubber or like material which is permeable to air but not water. A microscope cover slip 52 forms a roof for the live specimen chamber and overhangs the edge of the slide 49 so that a droplet of water containing the live specimen can be introduced at the overhanging edge and then fill the chamber by capillary action. The open edge is then sealed off with a reversible angled metal strip 53.

FIG. 8 illustrates an ant's nest arrangement built on a base 54.

A floor and ants' 'runs' 55 are fastened from a mixture of soil and resin glue, leading to a corner where is connected a tube 56 with a screw valve 57, the tube 56 being in turn connected to a feeding chamber 58 which can be supplied with syrup from a reservoir 59. Humidity is provided from a damp sponge beneath the nest base 54 and the nest is covered with a glass plate.

The live specimen slides and the ants' nest are, as before, contained within the region which is inaccessible to the viewer and which can only be accessed by the technician for maintenance or slide or specimen changing purposes.

The arrangements herein described are capable of variation and adaptation to suit different circumstances but generally provide interesting, controllable microscopic displays with full facility for focussing and changing specimens while providing information about the same, without exposing delicate microscope mechanisms or electrical connections or specimens to damage by untrained viewers and especially younger viewers.

We claim:

1. A microscope viewing arrangement adapted for exhibition use, comprising:

a plurality of microscopes, each of said microscopes comprising a console enclosing a microscope arrangement and affording a common viewing position, said console comprising an image display arrangement and an information display arrangement for displaying information associated with an image being displayed at the image display arrangement;

each of said microscope arrangements including said image display arrangment and comprising:

a specimen position;

specimen magazine means for holding a plurality of specimens;

magazine indexing means for selectively positioning specimens indiviaually at said specimen position;

a lamp arrangement for illuminating said specimen position; and remote focusing means adapted to focus an image of the specimen at the image display arrangement;

the plurality of microscopes and consoles being arranged to define said common viewing position, the lamp arrangement, remote focusing means and specimen position all being, in use, inaccessible from the common viewing position, but being accessible from a service position, remote from the common viewing position, for maintenance, adjustment and magazine-changing or loading purposes;

the microscope viewing arrangement further comprising:

an information changing arrangement interconnected with the magazine indexing means for changing the information displayed at the information display arrangement together with the selection of a specimen for positioning at the specimen position; and remote control means for said magazine indexing means;

said remote control means and said remote focusing means both being operable from the common viewing position;

wherein said specimen magazine means is controlled from said common viewing position; said information display arrangement is interconnected with said specimen magazine means to display information relevant to each individual specimen when located in said specimen position; said console comprises at least one information panel which is adapted to contain information relevant to a specimen, and selection means selectively illuminating said display panels; and said arrangement is adapted for use with said specimen magazine means to illuminate a particular information panel on location of a particular specimen in said specimen position.

2. An arrangement according to claim 1, wherein said specimen magazine means comprise an indexable carousel arrangement, said magazine indexing means and said indexable carousel arrangement being operable from the console.

3. An arrangement according to claim 1, comprising a microscope arrangement of which an eye-piece is situated in the console at the viewing position.

* * * * *